United States Patent
Uehara et al.

(10) Patent No.: US 6,562,153 B1
(45) Date of Patent: May 13, 2003

(54) STRAIN-INDUCED TYPE MARTENSITIC STEEL HAVING HIGH HARDNESS AND HAVING HIGH FATIGUE STRENGTH

(75) Inventors: Toshihiro Uehara, Yonago (JP); Etsuo Fujita, Yasugi (JP); Yoshihiro Minagi, Yasugi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 09/676,483

(22) Filed: Oct. 2, 2000

(30) Foreign Application Priority Data

Oct. 4, 1999 (JP) .......................... 11-282516

(51) Int. Cl.$^7$ .............................. C22C 38/58
(52) U.S. Cl. ...................... 148/325; 148/327
(58) Field of Search ................ 148/320, 325, 148/327; 420/34, 43, 44, 45, 46, 49, 50, 52, 56, 57, 60, 61

(56) References Cited

U.S. PATENT DOCUMENTS

| | | | |
|---|---|---|---|
| 3,840,366 A | * 10/1974 | Hirayama et al. ........ | 148/326 |
| 3,910,788 A | 10/1975 | Fujioka et al. | |
| 4,533,391 A | 8/1985 | Borneman et al. | |
| 4,568,387 A | 2/1986 | Ziemianski | |
| 5,147,475 A | 9/1992 | Holmberg ............... | 148/327 |
| 5,171,384 A | 12/1992 | Igawa et al. ............ | 148/611 |
| 5,242,655 A | 9/1993 | Holmberg ............... | 420/48 |
| 5,269,856 A | 12/1993 | Igawa et al. ............ | 148/609 |
| 5,411,701 A | 5/1995 | Holmberg ............... | 420/48 |
| 5,494,537 A | 2/1996 | Miyakusu et al. | |
| 5,571,343 A | * 11/1996 | Ryoo et al. ............. | 148/325 |

FOREIGN PATENT DOCUMENTS

| | | | |
|---|---|---|---|
| JP | 63259246 A | * 10/1988 | |
| JP | 7-300654 | 11/1995 | .......... C22C/38/00 |
| JP | 2000-63998 | 2/2000 | .......... C22C/38/00 |
| JP | 2000-73156 | 3/2000 | ............. C23C/8/26 |
| WO | WO 99/32682 | 7/1999 | |

OTHER PUBLICATIONS

Patent Abstract of Japan, 2000063998, Feb. 29, 2000.
Patent Abstract of Japan, 2000073156, Mar. 7, 2000.
Patent Abstract of Japan, 07300654, Nov. 14, 1995.
Patent Abstracts of Japan, 11293405, Oct. 26, 1999, Kumagai Atsushi, "High Hardness High Corrosion Resistance Stainless Steel".

* cited by examiner

*Primary Examiner*—Roy King
*Assistant Examiner*—Harry D. Wilkins, III
(74) *Attorney, Agent, or Firm*—Sughrue Mion, PLLC

(57) ABSTRACT

There is provided a steel of working-induced martensitic type steel consisting essentially, by mass, of 0.01 to 0.10% carbon, not more than 3.0% silicon, more than 5.0 but not more than 10.0% manganese, 1.0 to 12.0% nickel, 4 to 18% chromium, at least one kind of 0.1 to 4.0% in total in terms of Mo +1/2 W which at least one kind is selected from the group consisting of molybdenum and tungsten, from 0 inclusive but not more than 5.0% copper, from 0 inclusive but not more than 0.15% nitrogen, not more than 0.10% aluminum, not more than 0.005% oxygen, and the balance substantially iron, "A" value, which is defined by $$\text{``}A\text{''}=Ni+0.65Cr+0.98Mo+0.49W+1.05Mn+0.35Si+Cu+12.6(C+N) \quad (1)$$

with a proviso that any element which is not added is calculated as zero, being in a range of 13 to 27%, said steel containing in austenite a martensite phase of not less than 30 volume % after cold working.

12 Claims, No Drawings

STRAIN-INDUCED TYPE MARTENSITIC STEEL HAVING HIGH HARDNESS AND HAVING HIGH FATIGUE STRENGTH

BACKGROUND OF THE INVENTION

The present invention relates to a strain-induced type martensitic steel having high fatigue strength and high hardness which is suitably used for members, which are required to have both of high hardness and high fatigue strength, such as a power transmission belt etc. used in a continuously variable transmission etc., and a steel strip made of this strain-induced type martensitic steel.

Hitherto, for forming members required to have high strength such as members for rockets, members for a centrifugal separator, members for aircraft, members for a continuously variable transmission of an automobile, metal mold and etc., there has been mainly used a maraging steel having a very high tensile strength of about 2000 MPa, the representative composition of which is, for example, 18%Ni—8%Co—5%Mo—0.4%Ti—0.1%Al—bal. Fe. The maraging steel contains, as strengthening elements, much amount of each of Co and Mo which are expensive, so that the price of it becomes very high with the result that the maraging steel is used only for such particular uses as explained above.

In general, in a steel of high tensile strength used in a case where high strength is required, there are required not only both high hardness and high tensile strength but also both high fatigue strength and high toughness. In a case where the tensile strength is not more than 1200 MPa, there is such a tendency as the fatigue strength increases in proportion to the increase of the tensile strength, however, in a high strength steel having hardness not less than about 400 Hv and tensile strength not less than about 1200 MPa, the fatigue strength does not increase even in a case where both of the hardness and the tensile strength increase. This is also applicable to the maraging steel, that is, the fatigue strength thereof is not high although the maraging steel has high tensile strength. Thus, there has been desired a novel, high tensile strength steel cheap in price and having high fatigue strength which steel can be used in place of the conventional maraging steel.

SUMMARY OF THE INVENTION

The present inventors researched various high tensile steels in order to obtain a novel, high tensile steel which is usable in place of the conventional maraging steel.

First, as a relatively cheap, high hardness material, a quenched, martensite steel of 13% Cr type containing carbon of about 0.5% is researched. The steel of this type is produced by a process comprising the steps of cold-working the steel softened by annealing so that a predetermined dimensions may be obtained, and subjecting the cold-worked steel into a heat treatment including quenching and tempering. By this heat treatment is obtained a hard, martensite phase containing carbon, so that it becomes possible to obtain very high hardness regarding this steel.

However, in the steel, since it is necessary to perform the heat treatment of quenching and tempering for obtaining the high hardness, there are such problems as many steps are needed for obtaining an intended article, as the production steps are complicated, and as heat treatment deformation occurring during the quenching performed from a high temperature is large. Further, since the steel contains a relatively much amount of carbon, the weldability thereof is not necessarily good.

Then, the research is performed regarding Steel of JIS-SUS631 which is well known as a steel of a type in which martensite transformation occurs by cold working. In the steel of JIS-SUS 631, it is possible to obtain a hardness of about 490 Hv by performing solution heat-treatment, cold working, and aging treatment. However, in the steel of JIS-SUS 631, there is such a problem as the characteristics thereof such as hardness and etc. are very sensitive to the composition and the conditions of the heat treatment, so that the variation of the characteristics are apt to occur.

Further, it is possible to obtain high hardness by cold-working austenitic steels such as steels of JIS-SUS304 and JIS-SUS201. However, in the austenitic steels, since the austenite phase is a stable phase, only a part of the austenite phase is transformed into a strain-induced martensite even in a case where intensive cold-working is performed, and much of the austenite phase remains to be work-hardened austenite phase, so that there is such a problem as it is impossible to obtain a sufficiently high hardness.

The object of the invention is to provide a strain-induced type martensitic steel and a steel strip made of the strain-induced type martensitic steel.

In general, in a high tensile steel, fatigue fracture occurs due to the occurrence of cracks which commence at the surface of the steel and due to the propagation of the cracks, in a case of fatigue fracture occurring at a low cycle range, as disclosed in Japanese Mechanical Society Theses Vol. A64, pages 2536 to 2541. Further, in a very high cycle range exceeding $10^7$ cycles which are conventionally deemed to be fatigue limit, it is known that the fatigue fracture does not commence at the surface of the steel but commences at inclusions included in the interior of the steel.

In the conventional maraging steel, it is known that inclusions which become the internal initiating points of the fatigue fracture are TiN (or Ti(C, N)). Thus, the reducing of the TiN (or Ti(C, N)) as little of possible is deemed to be effective to enhance the level of the fatigue strength, and it is deemed that a high strength steel containing no Ti has high fatigue strength.

Thus, the present inventors aimed at strain-induced type martensitic steels in which high hardness can be obtained without using Ti which is a precipitation-strengthening element. However, in the strain-induced type martensitic steel, the characteristics are apt to vary similarly to the case of the JIS-SUS 631 steel explained above. Particularly, in the JIS-SUS 631 steel, there is such a shortcoming as the weldability thereof is inferior due to aluminum of 1 mass % contained therein, and there is such an advantage as high hardness can be obtained without adding expensive Co which is used in the maraging steel, with the result that the price thereof can be greatly lowered. Further, in the JIS-SUS 631 steel, since cold plastic working is used to obtain high hardness and a finished shape, there is such another advantage as no quenching which is performed from a high temperature in the case of the quenched, martensite steel explained above is needed, with the result that no heat treatment deformation occurs.

Thus, the present inventors researched regarding various alloying elements and the amount of each of them which alloying elements can remove the above-explained shortcoming occurring in the JIS-SUS 631 and which can maximize the above-explained advantages, and have found out that, by adding particular alloying elements each with an appropriate amount in the strain-induced type martensitic steel, by adding therein age-hardening elements such as Mo and Cu etc., and by performing aging treatment after cold plastic working, it becomes possible to obtain further improved, high strength.

The prevent inventors have further researched so, that there may be obtained a strain-induced type martensitic steel which can provide such high strength, high hardness and high fatigue strength as to be usable, for example, for producing a power transmission belt used in a continuously variable transmission of an automobile, and have achieved the present invention.

According to the first aspect of the invention, there is provided a strain-induced type martensitic steel having high hardness and high fatigue strength, consisting essentially, by mass, of 0.01 to 0.10% carbon, not more than 3.0% silicon, more than 5.0 but not more than 10.0% manganese, 1.0 to 12.0% nickel, 4 to 18% chromium, at least one kind of 0.1 to 4.0% in total in terms of Mo+1/2 W which at least one kind is selected from the group consisting of molybdenum and tungsten, from 0 inclusive but not more than 5.0% copper, from 0 inclusive but not more than 0.15% nitrogen, not more than 0.10% aluminum, not more than 0.065% oxygen, and the balance substantially iron, "A" value, which is defined by $$\text{"}A\text{"}=Ni+0.65Cr+0.98Mo+0.49W+1.05Mn+0.35Si+Cu+12.6(C+N) \quad (1)$$

with a proviso that any element which is not added is calculated as zero, being in a range of 13 to 27%, the steel containing in austenite a martensite phase of not less than 30 volume % after cold working.

According to the second aspect of the invention, there is provided a strain-induced type martensitic steel having high hardness and high fatigue strength, consisting essentially, by mass, of 0.01 to 0.10% carbon, not more than 3.0% silicon, more than 5.0 but not more than 7.0% manganese, 3.0 to 11.0% nickel, 4 to 16% chromium, at least one kind of 0.5 to 3.0% in total in terms of Mo+1/2 W which at least one kind is selected from the group consisting of molybdenum and tungsten, from 0 inclusive but not more than 4.0% copper, from 0 inclusive but not more than 0.15% nitrogen, not more than 0.05% aluminum, not more than 0.005% oxygen, and the balance substantially iron, "A" value, which is defined by $$\text{"}A\text{"}=Ni+0.65Cr+0.98Mo+0.49W+1.05Mn+0.35Si+Cu+12.6(C+N) \quad (1)$$

with a proviso that any element which is not added is calculated as zero, being in a range of 19 to 25%, the steel containing in austenite a martensite phase of not less than 30 volume % after cold working.

According to the third aspect of the invention, there is provided a strain-induced type martensitic steel having high hardness and high fatigue strength, consisting essentially, by mass, of 0.01 to 0.10% carbon, less than 1.0% silicon, more than 5.0 but not more than 7.0% manganese, 3.0 to 11.0% nickel, 4 to 16% chromium, at least one kind of 0.5 to 3.0% in total in terms of Mo+1/2 W which at least one kind is selected from the group consisting of molybdenum and tungsten, from 0 inclusive but not more than 4.0% copper, from 0 inclusive but not more than 0.15% nitrogen, not more than 0.05% aluminum, not more than 0.005% oxygen, and the balance substantially iron, "A" value, which is defined by $$\text{"}A\text{"}=Ni+0.65Cr+0.98Mo+0.49W+1.05Mn+0.35Si+Cu+12.6(C+N) \quad (1)$$

with a proviso that any element which is not added is calculated as zero, being in a range of 19 to 24%, the steel containing in austenite a martensite phase of not less than 30 volume % after cold working.

According to the fourth aspect of the invention, there is provided a strain-induced type martensitic steel having high hardness and high fatigue strength, wherein at least one kind not more than 0.2% in total selected from the group consisting of vanadium, titanium and niobium is added in the steel composition disclosed in any one of the first to third aspect of the inventions.

According to the fifth aspect of the invention, there is provided a strain-induced type martensitic steel having high hardness and high fatigue strength, wherein at least one kind not more than 0.10% in total selected from the group consisting of boron, magnesium and calcium is added in the steel composition disclosed in any one of the first to fourth aspect of the inventions.

According to the sixth aspect of the invention, there is provided a steel strip made of a strain-induced type martensitic steel having high hardness and high fatigue strength according to any one of the first to fifth aspect of the inventions, wherein the steel strip is provided with a hardness not less than 455 in Vickers hardness number.

According to the seventh aspect of the invention, there is provided a steel strip made of a strain-induced type martensitic steel having high hardness and high fatigue strength according to any one of the first to fifth aspect of the inventions, wherein the steel strip is provided with a nitride layer on the surface thereof, and compressive, residual stress existing in the surface thereof.

In the steel strip made of a strain-induced type martensitic steel according to the invention, it is possible to form a nitride layer on the surface thereof by appropriate nitriding treatment, and to provide compressive, residual stress in the surface.

DESCRIPTION OF PREFERRED EMBODIMENT OF THE INVENTION

In the invention, it is necessary to optimize the amount of addition regarding each of Ni, Cr, Mo, W, Mn, Si, Cu, C, and N which provide the easiness of strain-induced martensite transformation and which are elements for obtaining high hardness.

Regarding the elements of Ni, Cr, Mo, W, Mn, Si, Cu, C, and N, it is necessary not only to limit the content of each of these elements into the limited range, but also to make the elements satisfy the equation (1) disclosed above.

The "A" value defined in the equation (1) means Ni equivalent in the invention, and is an important index the value of which influences the easiness of the occurrence of the strain-induced martensite phase. In the "A" value, according to the effect of each of the elements influencing the easiness of the occurrence of the strain-induced martensite, the coefficient is multiplied by the mass % of each of the elements, and the resultant values thereof are totalized.

In the steel of the invention, in a case where the "A" value is less than 13, much amount of martensite phase occurs by cooling performed after solution heat treatment, and the amount of martensite occurring by the strain-induced transformation decreases, so that it becomes difficult to obtain sufficiently high hardness. On the other hand, in another case where the "A" value exceeds 27, the austenite phase becomes excessively stable with the result that it become difficult to obtain the strain-induced martensite occurring by cold plastic working, so that sufficiently high hardness can not be obtained. Thus, the "A" value is limited to be in the range of 13 to 27%. Preferably, the "A" value is in the range of 19 to 25% and most preferably 19 to 24%.

The function of each of the elements contained in the steel of the invention is explained below.

Carbon (C) is an element for forming the austenite and is effective to obtain austenitic structure after the solution heat treatment. Further, C is effective to strengthen the martensite structure occurring during cold working by strain-induced transformation and to thereby enhance the hardness.

However, in a case where C is added in excess of 0.10%, C is dissolved in the matrix with the results that the austenite phase becomes excessively stable, that it becomes difficult for the strain-induced transformation to occur and that work hardening becomes large with the result of cold working being difficult. On the other hand, in another case where C is less than 0.01%, not only sufficient hardness can not be obtained after cold working, but also delta ferrite occurs to make the hardness and hot workability deteriorated. Thus, the content of C is limited to be 0.01 to 0.10%.

Silicon (Si) is added by a slight amount for deoxidizing. Even if Si is added in excess of 3.0%, no additional effect occurs, so that the content of Si is limited to be not more than 3.0% and is preferably less than 1.0%.

Manganese (Mn) is an austenite-forming element and is effective to obtain the austenitic structure after the solution heat treatment. Further, regarding the controlling of the Ni equivalent defined by the "A" value, Mn can replace a part of Ni so that a much amount of Mn may be contained which is low in cost in comparison with Ni, so that there is such an advantage as the production cost of the steel can be lowered. In addition, Mn raises the solid-solubility of nitrogen dissolved in the austenite phase and makes the adding of nitrogen easy. Namely, Mn makes it possible to stably perform the adding of nitrogen (, that is, defects in casting due to nitrogen are reduced). In nitrogen-added steels, it is necessary to raise the content of Mn, however, in a case where Mn more than 10.0% is added, the cold workability is deteriorated, and in another case where Mn not more than 5.0% is added, the effect can not be obtained sufficiently. Thus, the content of Mn is limited to be more than 5.0% but not more than 10.0%. Preferably, it is more than 5.0% but not more than 7.0%.

Nickel (Ni) is an austenite-forming element similarly to Mn and is effective to obtain the austenitic structure after the solution heat treatment. Ni less than 1.0% can not obtain the effect sufficiently, however, Ni more than 12.0% makes the austenite phase so stable that the occurrence of the strain-induced martensite transformation becomes difficult with the result that it become difficult to obtain sufficiently high hardness. Thus, the content of Ni is limited to be 1.0 to 12.0%, and preferably 3.0 to 11.0%.

Chromium (Cr) is an important element for obtaining the strain-induced martensite. Cr less than 4.0% makes the austenite phase too stable, and Cr added more than 18.0% makes delta ferrite apt to occur with the result that the hot workability is deteriorated.

Thus, the content of Cr is limited to be 4.0 to 18.0%, and preferably 4.0 to 16.0%.

Molybdenum (Mo) is an element effective to raise the strength of the strain-induced martensite and is also effective to achieve the age hardening performed after the cold working. Thus, Mo is preferably added as an indispensable element.

Tungsten (W) is effective to raise the strength similarly to Mo, however, the effect of W is small insofar as W alone is added. Thus, when W is added, W is added in such a manner as to replace a part of Mo (which is equivalent to 1/2 W). The (Mo+1/2 W) less than 0.1% can not bring about the effect of raising the strength, however, the (Mo+1/2 W) more than 4.0% makes the delta ferrite apt to occur with the result that both the hot workability and cold workability are deteriorated. Thus, the (Mo+1/2 W) is limited to be 0.1 to 4.0%, and preferably 0.5 to 3.0%.

Copper (Cu) makes the working hardening exponent of the austenite small to thereby enhance the cold workability. Further, Cu has such an effect to raise strength by the age-precipitation thereof occurring during aging treatment performed after the cold working. Since Cu added in excess of 5.0% does not bring about further enhancement of the effect but deteriorates the hot workability, Cu is limited to be not more than 5.0%. Preferably, the content of Cu is not more than 4.0%. However, in a case where the steel is hardened only by the cold working, rather high hardness can be obtained by adding no Cu. Thus, the content of Cu may be 0%.

Nitrogen (N) is dissolved in the austenite phase and in the martensite phase to thereby raise the hardness and the work hardening exponent, so that N makes the hardening brought about by cold working large and makes large the hardening brought about by strain aging occurring in the aging treatment. However, when N is added in excess of 0.15%, the soundness of steel ingot is injured and the productivity of the steel is deteriorated, so that the content of N is limited to be not more than 0.15%. Further, in a case where welding is used in the steel, since the much amount of added N make the weldability deteriorated, a low content of N is preferable, and no addition thereof (0% N) may be adopted.

Aluminum (Al) is added by a small amount for deoxidizing. Since Al more than 0.10% makes $Al_2O_3$ inclusions much in amount, Al is limited to be not more than 0.10%, and preferably not more than 0.05%.

Oxygen (O) is an impurity which forms oxide inclusions to thereby decrease the toughness and fatigue strength of the steel. Thus, O is limited to be not more than 0.005% and preferably not more than 0.003%.

Each of vanadium (V), titanium (Ti) and niobium (Nb) does not necessarily need to be added, however, it forms primary carbides to thereby make crystal grains fine in size, which makes the hardness and ductility of the steel enhanced. Thus, one of more kinds of these elements may be added as occasion demands. In a case where the one or more kinds of the elements are added in excess of 0.2% in total, nitride inclusions occur which deteriorate the fatigue strength, and the cold workability is deteriorated by coarse primary carbides. The content of the one or more kinds of the elements is limited to be not more than 0.2% in total.

Also, each of boron (B), magnesium (Mg) and calcium (Ca) does not necessarily need to be added, however, it forms oxides or sulfides to thereby reduce the amount of sulfur and oxygen segregated in the crystal grain boundaries, so that it is effective to enhance the hot workability. Thus, one or more kind of the elements may be added as occasion demands. The adding of the total amount more than 0.10% of the one or more kinds can not bring about further enhancement of the effect, but decreases the index of cleanliness of the steel with the result that the hot workability and the cold workability are deteriorated. Thus, the total amount of the one or more kinds of B, Mg and Ca is limited to be not more than 0.10%.

As regards phosphorous (P) and sulfur (S) which are impurities, no problem occurs insofar as the levels of P and S mixed in a usual melting process are concerned, and it is preferred that, for keeping good corrosion resistance and good hot workability, the amounts of P and S are lowered to be not more than 0.04% and not more than 0.02%, respectively.

Even if the steel contains the above-explained constituents of the limited contents, it is impossible for the steel to obtain the intended high hardness and the high fatigue strength. That is, it is necessary to generate the strain-induced martensite phase by performing the cold working of the steel such as cold rolling, cold drawing or cold forging. In a case where the martensite phase occurring after the cold working is less than 30% in volume, it is impossible to obtain sufficiently high hardness and fatigue strength. Thus, the volume percent of the martensite phase occurring after the cold working is limited to be not less than 30%.

Then, when the steel strip is formed by use of the steel according to the invention, the high hardness and the high fatigue strength can be obtained by performing the cold working of the steel. By adjusting the amount of the martensite into an intended value after the appropriate cold working, it is possible to make the Vickers Hardness thereof not less than 455.

Further, in the steel strip made of the steel according to the invention, an aging treatment may be performed, as occasion demands, at a temperature of 400 to 600° C. after the cold working so that the ductility and spring characteristics etc. thereof may be enhanced without deteriorating the hardness.

Further, in the steel of the invention, nitriding can be performed without decreasing the hardness. In a case where the steel of the invention is formed into a strip and is nitrided under appropriate conditions so that the strip may be applied, for example, to a power transmission belt used as a part of the continuously variable transmission of an automobile, a nitride layer having a thickness of 20 to 40 $\mu$m can be formed on the strip substantially without forming any nitride, whereby large, compressive residual stress can be applied to the surface, and further high fatigue strength can be obtained. Although it is preferred that the level of the compressive residual stress occurring on the surface is high, it is possible to perform the controlling thereof by appropriately controlling the thickness and hardness of the nitride layer.

WORKING EXAMPLES

The invention is explained below in connection with the working examples. First, steel ingots each having a mass of about 10 kg was obtained through melting by use of vacuum melting, the chemical compositions of which are shown in Table 1. In Table 1, steel Nos. 1 to 15 belong to the steel of the invention, in which steel Nos. 1 to 15 each of the "A" value and the amount of the martensite phase obtained after the cold working fall in the numerical range limited in the invention, steel Nos. 31 to 36 being comparative steels in which at least one of the "A" value and the amount of the martensite phase obtained after the cold working is outside of the numerical range limited in the invention, and steel No. 37 is JIS-SUS 420 J" belonging to conventional quenching-and-tempering steels.

By performing the hot forging and hot rolling regarding each of the steel Nos. 1 to 37, a sheet of 2 mm in thickness was obtained, which was then subjected, after heating at 1050° C., to a solution heat treatment followed by air cooling. After that, in order to obtain a steel strip, the cold rolling therof was performed at a rolling reduction of 50 to 70%, and the resultant steel strip was subjected to an aging treatment at about 450° C. The steel No. 36 was quenched from 950° C. and then was tempered at 300° C.

The amount of the martensite phase was measured by the X-ray diffraction method. As regards the hardness, it was obtained by measuring Vickers hardness number in a longitudinal section of the cold rolled sheet. Regarding the fatigue strength, there were used sheet-shaped test pieces each having a thickness of 0.2 mm and a width of 10 mm, flex fatigue tests being performed at a repeated bending rate of 1000 cpm with a bending angle of ±25° while varying the span of the length, and fatigue strength at the number of cycles of $1 \times 10^7$ cycles was obtained.

TABLE 1

| Steel No. | Chemical Composition (mass %) | | | | | | | | | | |
|---|---|---|---|---|---|---|---|---|---|---|---|
| | C | Si | Mn | P | S | Ni | Cr | W | Mo | Cu | N |
| 1 | 0.04 | 0.46 | 5.57 | 0.021 | 0.003 | 3.48 | 14.00 | —* | 1.12 | — | 0.026 |
| 2 | 0.04 | 0.55 | 5.48 | 0.024 | 0.003 | 6.04 | 10.27 | — | 1.03 | — | 0.037 |
| 3 | 0.04 | 0.54 | 5.51 | 0.025 | 0.003 | 6.12 | 13.94 | — | 1.59 | — | 0.053 |
| 4 | 0.04 | 0.58 | 5.55 | 0.021 | 0.003 | 10.1 | 5.06 | — | 1.34 | — | 0.041 |
| 5 | 0.05 | 0.41 | 6.19 | 0.019 | 0.003 | 10.2 | 9.93 | — | 0.81 | — | 0.038 |
| 6 | 0.08 | 0.52 | 5.57 | 0.022 | 0.004 | 3.55 | 13.93 | — | 1.99 | — | 0.109 |
| 7 | 0.04 | 0.43 | 5.52 | 0.015 | 0.004 | 3.59 | 14.01 | — | 2.02 | 1.03 | 0.087 |
| 8 | 0.04 | 0.59 | 5.59 | 0.016 | 0.003 | 4.67 | 11.12 | 0.58 | 1.51 | 0.21 | 0.052 |
| 9 | 0.04 | 2.11 | 5.98 | 0.014 | 0.004 | 4.22 | 11.38 | — | 1.15 | 1.59 | 0.038 |
| 10 | 0.03 | 0.47 | 5.64 | 0.019 | 0.002 | 3.41 | 12.04 | — | 2.01 | 1.13 | 0.065 |
| 11 | 0.03 | 0.87 | 5.73 | 0.016 | 0.003 | 5.46 | 10.44 | — | 3.12 | 2.26 | 0.043 |
| 12 | 0.04 | 0.51 | 5.69 | 0.017 | 0.003 | 3.69 | 14.21 | — | 1.97 | 0.52 | 0.041 |
| 13 | 0.04 | 0.76 | 5.52 | 0.019 | 0.003 | 3.77 | 12.12 | — | 2.04 | 1.09 | 0.089 |
| 14 | 0.04 | 0.41 | 5.53 | 0.021 | 0.002 | 3.68 | 13.25 | — | 1.13 | 1.17 | 0.049 |
| 15 | 0.03 | 0.37 | 5.49 | 0.022 | 0.003 | 3.93 | 11.96 | — | 0.86 | 0.96 | 0.033 |
| 31 | 0.07 | 0.54 | 4.26 | 0.016 | 0.003 | 4.69 | 11.31 | — | 0.12 | — | 0.063 |
| 32 | 0.10 | 0.56 | 1.76 | 0.023 | 0.003 | 8.53 | 15.67 | — | 3.31 | 0.42 | 0.110 |
| 33 | 0.04 | 0.56 | 5.78 | 0.023 | 0.003 | 6.33 | 16.10 | — | 5.36 | — | 0.091 |
| 34 | 0.08 | 0.67 | 1.98 | 0.021 | 0.004 | 8.51 | 18.53 | — | 3.01 | 0.21 | 0.096 |
| 35 | 0.05 | 0.63 | 1.76 | 0.021 | 0.005 | 8.53 | 18.68 | — | — | — | 0.014 |
| 36 | 0.04 | 0.43 | 4.87 | 0.015 | 0.004 | 3.49 | 10.12 | — | 1.01 | — | 0.024 |
| 37 | 0.33 | 0.42 | 0.51 | 0.027 | 0.006 | 0.13 | 12.13 | — | — | — | — |

TABLE 1-continued

| Steel No. | V | Ti | Nb | B | Mg | Ca | Al | O | Fe | "A" value | Remarks |
|---|---|---|---|---|---|---|---|---|---|---|---|
| 1 | — | — | 0.10 | — | — | — | 0.020 | 0.002 | bal. | 20.52 | Steels of |
| 2 | — | — | 0.10 | — | — | — | 0.005 | 0.001 | bal. | 20.64 | the Invention |
| 3 | — | — | 0.10 | — | — | — | 0.008 | 0.002 | bal. | 23.89 | |
| 4 | — | — | 0.10 | — | — | — | 0.009 | 0.002 | bal. | 21.70 | |
| 5 | — | — | 0.10 | — | — | — | 0.010 | 0.001 | bal. | 25.24 | |
| 6 | — | — | 0.11 | — | — | — | 0.020 | 0.001 | bal. | 22.97 | |
| 7 | — | — | 0.09 | — | — | — | 0.006 | 0.001 | bal. | 23.25 | |
| 8 | — | — | — | — | — | — | 0.001 | 0.003 | bal. | 21.11 | |
| 9 | — | — | 0.10 | — | — | — | 0.004 | 0.002 | bal. | 22.33 | |
| 10 | 0.08 | — | — | — | — | — | 0.010 | 0.001 | bal. | 21.62 | |
| 11 | — | — | 0.07 | — | — | — | 0.007 | 0.002 | bal. | 24.80 | |
| 12 | — | 0.03 | 0.04 | — | — | 0.001 | 0.009 | 0.001 | bal. | 22.55 | |
| 13 | — | 0.02 | — | 0.003 | — | — | 0.002 | 0.003 | bal. | 22.42 | |
| 14 | — | — | 0.07 | — | 0.002 | — | 0.003 | 0.003 | bal. | 21.64 | |
| 15 | — | — | — | 0.002 | — | — | 0.020 | 0.001 | bal. | 20.19 | |
| 31 | — | — | — | — | — | — | 0.010 | 0.002 | bal. | 18.50 | Comparative |
| 32 | — | — | — | — | — | — | 0.009 | 0.003 | bal. | 27.07 | Steels |
| 33 | — | — | 0.10 | — | — | — | 0.020 | 0.001 | bal. | 29.96 | |
| 34 | — | — | 0.11 | — | — | — | 0.010 | 0.001 | bal. | 28.25 | |
| 35 | — | — | — | — | — | — | 0.005 | 0.003 | bal. | 23.55 | |
| 36 | — | — | 0.10 | — | — | — | 0.008 | 0.002 | bal. | 17.13 | |
| 37 | — | — | — | — | — | — | 0.020 | 0.001 | bal. | 12.86 | Conventional Steel |

*The mark "—" means no addition.

TABLE 2

| Steel No. | Cold Working Ratio (%) | Amount of martensite (%) | Hardness Hv | Fatigue strength (MPa) | Remarks |
|---|---|---|---|---|---|
| 1 | 70 | 91 | 526 | 900 | Steel of the invention |
| 2 | 60 | 93 | 592 | 900 | Steel of the invention |
| 3 | 60 | 81 | 588 | 900 | Steel of the invention |
| 4 | 60 | 72 | 563 | 850 | Steel of the invention |
| 5 | 70 | 32 | 455 | 800 | Steel of the invention |
| 6 | 50 | 74 | 569 | 800 | Steel of the invention |
| 7 | 70 | 53 | 557 | 850 | Steel of the invention |
| 8 | 50 | 81 | 529 | 900 | Steel of the invention |
| 9 | 50 | 72 | 579 | 850 | Steel of the invention |
| 10 | 70 | 56 | 544 | 900 | Steel of the invention |
| 11 | 70 | 41 | 533 | 850 | Steel of the invention |
| 12 | 70 | 58 | 524 | 850 | Steel of the invention |
| 13 | 70 | 65 | 541 | 800 | Steel of the invention |
| 14 | 70 | 83 | 547 | 800 | Steel of the invention |
| 15 | 50 | 98 | 521 | 850 | Steel of the invention |
| 31 | 50 | 99 | 582 | 700 | Comparative steel |
| 32 | 50 | 28 | 451 | 700 | Comparative steel |
| 33 | 50 | 10 | 403 | 550 | Comparative steel |
| 34 | 50 | 11 | 416 | 550 | Comparative steel |
| 35 | 70 | 19 | 402 | 600 | Comparative steel |
| 36 | 70 | 100 | 475 | 500 | Comparative steel |
| 37 | — | 100 | 476 | 700 | Conventional steel |

As apparent from Table 2, each of Steel Nos. 1 to 15 embodying the invention reveals a high Vickers hardness number not less than 455 after the cold working. Further, according to the result of the flex fatigue test, each of the steels according to the invention reveals high fatigue strength not less than 800 MPa.

On the other hand, in each of the comparative steel Nos. 31 to 36 and the conventional steel No. 37 in both of which any one of the "A" value and the amount of the martensite phase occurring after the cold working is outside of the numerical range limited in the invention, any one of the characteristics of the hardness and the fatigue strength obtained in the flex fatigue test is inferior to that of the steels of the invention. Particularly, in the comparative steel Nos. 32 to 35 in which both of the "A" value and the amount of the martensite phase are outside of the range limited in the invention, the hardness is low and it is impossible to obtain the high hardness intended in the invention.

Further, in the steels of the invention, the Vickers hardness number thereof is in such a low level as to be not more than 350, so that the cold workability thereof is good and the cold forming was able to be performed readily.

In addition, by performing after the aging treatment a nitriding treatment at a temperature lower than the aging temperature or by performing the nitriding treatment also serving as the aging treatment, it is impossible to form a nitride layer having a thickness of about 20 to 40 μm, and because of the effect of the compressive residual stress occurring on the surface of the steel by the nitriding, the fatigue strength can be further raised by the degree of about 300 MPa.

As explained above, since the strain-induced type martensitic steel has high hardness and superior fatigue strength, the steel can be used for producing members and parts required to have both high hardness and high fatigue strength such as, for example, parts for rockets, parts for centrifugal separators, parts for air crafts, parts for the continuously variable transmission of automobiles, and metal mold etc., and the resultant members or parts can be used for a prolonged service time. Further, the steel strip made of the steel of the invention can be favorably used for producing a power transmission belt having superior characteristics which belt is used as a part of the continuously variable transmission of an automobile engine. Thus, the invention can realize industrially remarkable advantages.

What is claimed is:

1. A power transmission belt in combination with a continuously variable transmission, said power transmission belt comprising a base material made of a strain-induced martensitic steel consisting essentially, by mass, of 0.01 to 0.10% carbon, not more than 3.0% silicon, more than 5.0 but not more than 10.0% manganese, 1.0 to 12.0% nickel, 4 to 18% chromium, Mo and optional W in an amount of 0.1 to 4.0% in total in terms of Mo+1/2 W; from 0 inclusive but not more than 5.0% copper, from 0 inclusive but not more than 0.15% nitrogen, not more than 0.10% aluminum, not more than 0.005% oxygen, and the balance substantially iron, said strain-induced martensitic steel having an "A" value, which is defined by $$"A"=Ni+0.65Cr+0.98Mo+0.49W+1.05Mn+0.35Si+Cu+12.6(C+N) \quad (1)$$

with a proviso that any element which is not added is calculated as zero, in a range of 13 to 25%, said steel containing in austenite a martensite phase of not less than 30 volume % after cold working and wherein the said power transmission belt has a fatigue strength of not less than 800 MPa.

2. A power transmission belt according to claim 1, wherein in the strain-induced martensitic steel the content of manganese is more than 5.0 but not more than 7.0%, the content of nickel being 3.0 to 11.0%, the content of chromium being not less than 4 but not more than 16%, the content of (Mo+1/2W) being not less than 0.5 but not more than 3.0%, the content of copper being in a range from 0 inclusive to 4.0%, the content of aluminum being not more than 0.05%, the value of "A" defined by the equation (1) being in a range of 19 to 25%.

3. A power transmission belt according to claim 2, wherein said power transmission belt is provided on a surface thereof with a nitride layer, which surface is provided with a compressive residual stress.

4. A power transmission belt according to claim 1, wherein in the strain-induced martensitic steel the content of silicon is less than 1.0%, the content of manganese being more than 5.0 but not more than 7.0%, the content of nickel being 3.0 to 11.0%, the content of chromium being not less than 4 but not more than 16%, the content of (Mo+1/2W) being not less than 0.5 but not more than 3.0%, the content of copper being in a range from 0 inclusive to 4.0%, the content of aluminum being not more than 0.05%, the value of "A" defined by the equation (1) being in a range of 19 to 24%.

5. A power transmission belt according to claim 4, wherein said power transmission belt is provided on a surface thereof with a nitride layer, which surface is provided with a compressive residual stress.

6. A power transmission belt according to claim 1, wherein said power transmission belt is provided on a surface thereof with a nitride layer, which surface is provided with a compressive residual stress.

7. A power transmission belt in combination with a continuously variable transmission, said power transmission belt comprising a base material made of a strain-induced martensitic steel consisting essentially, by mass, of: 0.01 to 0.10% carbon; not more than 3.0% silicon; more than 5.0 but not more than 10.0% manganese; 1.0 to 12.0% nickel, 4 to 18% chromium; Mo and optional W in an amount of 0.1 to 4.0% in total in terms of Mo+1/2 W; from 0 inclusive but not more than 5.0% copper, from 0 inclusive but not more than 0.15% nitrogen, not more than 0.10% aluminum; not more than 0.005% oxygen; at least one element in an amount of not more than 0.2% but not less than 0.02% in total selected from the group consisting of vanadium, titanium and niobium; and the balance substantially iron, said strain-induced martensitic steel having an "A" value, which is defined by $$"A"=Ni+0.65Cr+0.98Mo+0.49W+1.05Mn+0.35Si+Cu+12.6(C+N) \quad (1)$$

with a proviso that any element which is not added is calculated as zero, in a range of 13 to 25%, said steel containing in austenite a martensite phase of not less than 30 volume % after cold working and wherein the said power transmission belt has a fatigue strength of not less than 800 MPa.

8. A power transmission belt according to claim 7, wherein said power transmission belt is provided on a surface thereof with a nitride layer, which surface is provided with a compressive residual stress.

9. A power transmission belt in combination with a continuously variable transmission, said power transmission belt comprising a base material made of a strain-induced martensitic steel consisting essentially, by mass, of: 0.01 to 0.10% carbon; not more than 3.0% silicon; more than 5.0 but not more than 10.0% manganese; 1.0 to 12.0% nickel, 4 to 18% chromium; Mo and optional W in an amount of 0.1 to 4.0% in total in terms of Mo+1/2 W; from 0 inclusive but not more than 5.0% copper; from 0 inclusive but not more than 0.15% nitrogen; not more than 0.10% aluminum; not more than 0.005% oxygen; at least one element in an amount of not more than 0.10% in total selected from the group consisting of boron, magnesium and calcium; and the balance substantially iron, said strain-induced martensitic steel having an "A" value, which is defined by $$"A"=Ni+0.65Cr+0.98Mo+0.49W+1.05Mn+0.35Si+Cu+12.6(C+N) \quad (1)$$

with a proviso that any element which is not added is calculated as zero, in a range of 13 to 25%, said steel containing in austenite a martensite phase of not less than 30 volume % after cold working and wherein the said power transmission belt has a fatigue strength of not less than 800 MPa.

10. A power transmission belt according to claim 9, wherein said power transmission belt is provided on a surface thereof with a nitride layer, which surface is provided with a compressive residual stress.

11. A power transmission belt in combination with a continuously variable transmission, said power transmission belt comprising a base material made of a strain-induced martensitic steel consisting essentially, by mass, of: 0.01 to 0.10% carbon; not more than 3.0% silicon; more than 5.0 but not more than 10.0% manganese; 1.0 to 12.0% nickel, 4 to 18% chromium; Mo and optional W in an amount of 0.1 to 4.0% in total in terms of Mo+1/2; from 0 inclusive but not more than 5.0% copper, from 0 inclusive but not more than 0.15% nitrogen; not more than 0.10% aluminum; not more than 0.005% oxygen; at least one element in an amount of not more than 0.2% in total selected from the group consisting of vanadium, titanium and niobium; at least one element in an amount of not more than 0.10% in total selected from the group consisting of boron, magnesium and calcium; and the balance substantially iron, said strain-induced martensitic steel having an "A" value, which is defined by $$"A"=Ni+0.65Cr+0.98Mo+0.49W+1.05Mn+0.35Si+Cu+12.6(C+N) \quad (1)$$

with a proviso that any element which is not added is calculated as zero, in a range of 13 to 25%, said steel containing in austenite a martensite phase of not less than 30 volume % after cold working and wherein the said power transmission belt has a fatigue strength of not less than 800 MPa.

12. A power transmission belt according to claim 11, wherein said power transmission belt is provided on a surface thereof with a nitride layer, which surface is provided with a compressive residual stress.

* * * * *